United States Patent
Roessler et al.

(10) Patent No.: US 9,883,213 B2
(45) Date of Patent: Jan. 30, 2018

(54) EMBEDDING ENCODED AUDIO INTO TRANSPORT STREAM FOR PERFECT SPLICING

(71) Applicant: Dolby International AB, Amsterdam Zuidoost (NL)

(72) Inventors: Marc Roessler, Nuremberg (DE); Malte Schmidt, Feucht (DE)

(73) Assignee: Dolby International AB, Amsterdam (NL)

( * ) Notice: Subject to any disclaimer, the term of this patent is extended or adjusted under 35 U.S.C. 154(b) by 0 days.

(21) Appl. No.: 15/111,988

(22) PCT Filed: Feb. 10, 2015

(86) PCT No.: PCT/EP2015/052732
§ 371 (c)(1),
(2) Date: Jul. 15, 2016

(87) PCT Pub. No.: WO2015/118164
PCT Pub. Date: Aug. 13, 2015

(65) Prior Publication Data
US 2016/0366452 A1    Dec. 15, 2016

Related U.S. Application Data

(60) Provisional application No. 61/938,067, filed on Feb. 10, 2014, provisional application No. 62/108,752, filed on Jan. 28, 2015.

(51) Int. Cl.
*H04N 7/173*        (2011.01)
*H04N 21/234*       (2011.01)
(Continued)

(52) U.S. Cl.
CPC ... *H04N 21/23424* (2013.01); *H04N 21/2335* (2013.01); *H04N 21/2362* (2013.01);
(Continued)

(58) Field of Classification Search
None
See application file for complete search history.

(56) References Cited

U.S. PATENT DOCUMENTS 6,181,383 B1 *  1/2001  Fox .................. H04N 21/23424
                                              348/423.1
6,298,089 B1   10/2001  Gazit
(Continued)

FOREIGN PATENT DOCUMENTS

JP    H11-346348    12/1999
JP    H11-355722    12/1999
(Continued)

OTHER PUBLICATIONS

Dolby AC-4 AUdio System for Next-Generatin Broadast Services.*
(Continued)

*Primary Examiner* — An Son P Huynh

(57) ABSTRACT

Methods for generating a transport stream (e.g., an MPEG-2 transport stream) such that the transport stream has at least one perfect splicing property, and/or such that the transport stream is indicative of at least one audio/video program and includes metadata indicative of whether the program has a perfect splicing property. Other aspects are methods for splicing such a transport stream, audio/video processing units (e.g., splicers) configured to perform any embodiment of the inventive method, and audio/video processing units which include a buffer memory which stores at least one segment of transport stream generated in accordance with any embodiment of the inventive method.

23 Claims, 3 Drawing Sheets

(51) Int. Cl.
  *H04N 21/61*    (2011.01)
  *H04N 21/647*   (2011.01)
  *H04N 21/233*   (2011.01)
  *H04N 21/236*   (2011.01)
  *H04N 21/2362*  (2011.01)

(52) U.S. Cl.
  CPC ... *H04N 21/23605* (2013.01); *H04N 21/6112* (2013.01); *H04N 21/6143* (2013.01); *H04N 21/6168* (2013.01); *H04N 21/6175* (2013.01); *H04N 21/6181* (2013.01); *H04N 21/6187* (2013.01); *H04N 21/6473* (2013.01); *H04N 21/64776* (2013.01)

(56) References Cited

U.S. PATENT DOCUMENTS

| | | | | |
|---|---|---|---|---|
| 6,792,047 | B1* | 9/2004 | Bixby | H04N 21/23424 375/240.26 |
| 6,806,909 | B1 | 10/2004 | Radha | |
| 6,993,081 | B1* | 1/2006 | Brunheroto | H04N 21/23406 370/487 |
| 7,058,189 | B1* | 6/2006 | Grimm | G11B 27/028 381/119 |
| 7,068,719 | B2 | 6/2006 | Liu | |
| 7,574,102 | B2 | 8/2009 | Kelly | |
| 2001/0033619 | A1* | 10/2001 | Hanamura | H04N 21/2343 375/240.26 |
| 2002/0018645 | A1* | 2/2002 | Nakamatsu | G11B 27/036 386/278 |
| 2002/0191107 | A1 | 12/2002 | Hu | |
| 2003/0035425 | A1* | 2/2003 | Abdollahi | H04L 41/0213 370/392 |
| 2004/0143675 | A1* | 7/2004 | Aust | H04L 29/06027 709/236 |
| 2004/0218093 | A1* | 11/2004 | Radha | H04N 21/233 348/384.1 |
| 2006/0101322 | A1* | 5/2006 | Abbott | H04N 7/17318 715/203 |
| 2006/0111899 | A1* | 5/2006 | Padhi | G10L 19/005 704/221 |
| 2007/0092200 | A1* | 4/2007 | Black | H04N 21/4113 386/217 |
| 2007/0171306 | A1* | 7/2007 | Lowet | H04N 5/4401 348/565 |
| 2008/0267222 | A1* | 10/2008 | Leung | H04N 21/23424 370/503 |
| 2008/0310451 | A1* | 12/2008 | Kang | H04N 21/235 370/474 |
| 2009/0106288 | A1* | 4/2009 | Yang | H04N 7/17318 |
| 2009/0274453 | A1* | 11/2009 | Viswambharan | G11B 20/10 386/241 |
| 2009/0296741 | A1* | 12/2009 | Kizuka | H04H 20/30 370/487 |
| 2010/0189131 | A1* | 7/2010 | Branam | H04N 21/23424 370/474 |
| 2010/0223059 | A1* | 9/2010 | Huang | H04M 3/493 704/270.1 |
| 2010/0254673 | A1* | 10/2010 | Begen | H04N 7/17318 386/239 |
| 2011/0150099 | A1 | 6/2011 | Owen | |
| 2011/0157475 | A1* | 6/2011 | Wright | G06K 9/00765 348/700 |
| 2011/0246622 | A1* | 10/2011 | Pantos | H04L 65/1083 709/219 |
| 2011/0293021 | A1 | 12/2011 | Kotalwar | |
| 2012/0047282 | A1* | 2/2012 | Mehta | H04N 21/23424 709/231 |
| 2012/0072958 | A1* | 3/2012 | Smyth | H04N 7/17318 725/93 |
| 2012/0311649 | A1* | 12/2012 | Patten | G06Q 30/02 725/97 |
| 2013/0141643 | A1 | 6/2013 | Carson | |
| 2015/0062353 | A1* | 3/2015 | Dalal | G11B 27/3036 348/194 |
| 2015/0073812 | A1* | 3/2015 | Lowe | G10H 1/06 704/500 |
| 2016/0088320 | A1* | 3/2016 | Yamashita | H04N 5/602 725/116 |

FOREIGN PATENT DOCUMENTS

| | | |
|---|---|---|
| JP | 2000-287178 | 10/2000 |
| JP | 2002-300527 | 10/2002 |
| JP | 2007-195208 | 8/2007 |
| JP | 2013-515401 | 5/2013 |
| WO | 99/13648 | 3/1999 |
| WO | 2010/009037 | 1/2010 |

OTHER PUBLICATIONS

ETSI releases AC-4, the new generation audio codec standard, Apr. 2014, pp. 1-2.*

SMPTE Standard for Television "Splice Points for MPEG-2 Transport Streams" SMPTE 312M-2001, revision of SMPTE 312M-1999, pp. 1-21.

Deursen, Davy Van et al "Semantic Adaptation of Synchronized Multimedia Streams in a Format-Independent Way" Picture Coding Symposium, IEEE Piscataway, NJ, USA, May 6, 2009, pp. 1-4.

ETSI "ETSI TS 103 190 v1.1.1., Digital Audio Compression (AC-4) Standard" Apr. 2014.

* cited by examiner

EMBEDDING ENCODED AUDIO INTO TRANSPORT STREAM FOR PERFECT SPLICING

CROSS-REFERENCE TO RELATED APPLICATION

The present application claims the benefit of the filing date of U.S. Provisional Patent Application No. 61/938,067, filed on Feb. 10, 2014.

TECHNICAL FIELD

The invention pertains to audio and video signal processing, and more particularly, to generation and splicing of transport streams (bitstreams) which include video data and encoded audio data and optionally also metadata indicative of at least one splicing property satisfied by the transport stream. Some embodiments of the invention generate or splice transport streams having MPEG-2 transport stream format, which include encoded audio data in the format known as AC-4.

BACKGROUND OF THE INVENTION

The MPEG-2 transport stream format is a standard format for transmission and storage of video data, encoded audio data, and related data. The MPEG-2 transport stream format is specified in the standard known as MPEG-2 Part 1, Systems (ISO/IEC standard 13818-1 or ITU-T Rec. H.222.0). An MPEG-2 transport stream has a specified container format which encapsulates packetized elementary streams.

MPEG-2 transport streams are commonly used to broadcast audio and video content, for example, in the form of DVB (Digital Video Broadcasting) or ATSC (Advanced Television Systems Committee) TV broadcasts. It is often desirable to implement a splice between two MPEG-2 transport streams Although the invention is not limited to generation and/or splicing of transport streams having MPEG-2 transport stream format, typical embodiments are methods and systems for generating and/or splicing MPEG-2 transport streams. Transport streams having other formats may be generated and/or spliced in accordance with other embodiments of the invention, if each such transport stream includes frames (including I-frames) of video data and frames (including I-frames) of encoded audio data which satisfy certain properties described herein. A transport stream generated and/or spliced in accordance with a class of typical embodiments of the invention may also include metadata indicative of at least one splicing property satisfied by the transport stream.

An MPEG-2 transport stream carries (i.e., includes data indicative of) elementary streams (e.g., an elementary stream of video data output from a video encoder, and at least one corresponding elementary stream of encoded audio data output from an audio encoder) in packets. Each elementary stream is packetized by encapsulating sequential data bytes from the elementary stream in packetized elementary stream ("PES") packets having PES packet headers. Typically, elementary stream data (output from video and audio encoders) is packetized as PES packets, the PES packets are then encapsulated inside Transport Stream (TS) packets, and the TS packets are then multiplexed to form the transport stream. Typically, each PES packet is encapsulated into a sequence of TS packets.

An MPEG-2 transport stream may be indicative of one or more audio/video programs. Each single program is described by a Program Map Table (PMT) which has a unique identification value (PID), and the elementary stream(s) associated with that program has (or have) a PID listed in the PMT. For example, a transport stream may be indicative of three television programs, each program corresponding to a different television channel. In the example, each program (channel) may consist of one video elementary stream and a number of (e.g., one or two) encoded audio elementary streams, and any necessary metadata. A receiver wishing to decode a particular program (channel) must decode the payloads of each elementary stream whose PID is associated with the program.

An MEG-2 transport stream includes Program Specific Information (PSI), typically comprising data indicative of four PSI tables: a program association table (PAT), a program map table (PMT) for each program, a conditional access table (CAT), and a network information table (NIT). The program association table lists all programs indicated by (included in) the transport stream, and each of the programs has an associated value of PID for its program map table (PMT). The PMT for a program lists each elementary stream of the program, and includes data indicative of other information regarding the program.

An MPEG-2 transport stream includes presentation time stamp ("PTS") values which are used to achieve synchronization of separate elementary streams (e.g., video and encoded audio streams) of a program of the transport stream. The PTS values are given in units related to a program's overall clock reference, which is also transmitted in the transport stream. All TS packets that comprise an audio or video frame (indicated by a PES packet) have the same PTS time stamp value.

A typical transport stream (e.g., an MPEG-2 transport stream) includes encoded audio data (typically, compressed audio data indicative of one or more channels of audio content), video data, and metadata indicative of at least one characteristic of the encoded audio (or encoded audio and video) content. Although the invention is not limited to generation of transport streams whose audio content is audio data encoded in accordance with the AC-4 format ("AC-4 encoded audio data"), typical embodiments are methods and systems for generating and/or splicing transport streams (e.g., MPEG-2 transport streams) including AC-4 encoded audio data.

The AC-4 format for encoding of audio data is well-known, and was published in April 2014 in the document entitled the "ETSI TS 103 190 V1.1.1 (2014-04), Digital Audio Compression (AC-4) Standard."

MPEG-2 transport streams are commonly used to broadcast audio and video content, for example in the form of DVB (Digital Video Broadcasting) or ATSC (Advanced Television Systems Committee) TV broadcasts. Sometimes it is desirable to implement a splice between two MPEG-2 (or other) transport streams. For example, it may be desirable for a transmitter to implement splices in a first transport stream to insert an advertisement (e.g., a segment of another stream) between two segments of the first transport stream. Conventional systems, known as transport stream splicers, are available for performing such splicing. The sophistication of conventional splicers varies, and conventional transport streams are usually generated with the assumption that splicers will be aware of and able to understand all the codecs contained in them (i.e., will be able to parse their video and encoded audio content, and metadata) in order to perform splices on them. This leaves much room for errors for the implementation of splices, and gives rise to many problems with interoperability between muxers (which perform multiplexing to generate transport streams) and splicers.

It is conventional to include, in an MPEG-2 transport stream, metadata which specifically identifies available splice points (specific times at which there are opportunities to splice in a desired manner, e.g., samples or packets having specific time codes immediately before (or after) which there are opportunities to splice in the desired manner) for each program indicated by the stream. Such metadata must be inserted in the transport stream during the encoding process. However, it would be desirable to reduce the complexity of methods (and systems) for generating transport streams (e.g., MPEG-2 transport streams) by eliminating the need to identify and indicate specific available splice points in the transport streams. In accordance with typical embodiments of the present invention, transport streams are generated without the need to identify and indicate specific available splice points therein, and such that splicers having any of variety of capabilities (including simple splicers having very limited capabilities) can splice the transport streams in a manner which guarantees that audio/video synchronization ("A/V" sync) is maintained in the resulting spliced streams without any need for modification of any encoded audio elementary stream of any of the transport streams.

Some conventional audio codecs encode audio in a format which supports the maintenance of perfect A/V sync upon the splicing of programs which include the encoded audio data. However, when it is necessary to splice transport streams (which include such encoded audio, or audio encoded in other formats), extra care needs to be taken in the preparation of each transport stream and the execution of each splice, as it is easy to damage an audio elementary stream (indicated by a transport stream) during execution of a splice. The muxer (which performs multiplexing to generate each transport stream) and the splicer downstream implicitly work together to generate a good splice, with the muxer multiplexing in some way and the splicer expecting the transport stream to have specific properties. Typical embodiments of the present invention define a set of features (of a transport stream) that help splicing of the transport stream (even by very simple splicers), and typically also include metadata in a transport stream which communicate such feature set to splicers.

BRIEF DESCRIPTION OF EXEMPLARY EMBODIMENTS OF THE INVENTION

In a first class of embodiments, the invention is a method for generating a transport stream (e.g., an MPEG-2 transport stream), including a step of packaging (i.e., including) encoded audio data (sometimes referred to herein as "CA") and video data in the transport stream such that the transport stream has at least one perfect splicing property (i.e., the "essential" perfect splicing property defined below, and optionally also has at least one additional perfect splicing property). In this context, a "perfect splicing property" denotes one of the perfect splicing properties defined herein, and the "essential" perfect splicing property guarantees that audio/video synchronization ("A/V" sync) is maintained when splicing the transport stream without the need for modification by the splicer of any encoded audio elementary stream of the transport stream. A transport stream generated in accordance with an embodiment in the first class is indicative of at least one audio/video program ("program"), and includes (for each program indicated thereby) frames of video data (which determine at least one video elementary stream) and frames of corresponding encoded audio data (which determine at least one audio elementary stream). The frames of video data include I-frames of video data, and the frames of encoded audio data include I-frames of encoded audio data.

Herein, "I-frame" denotes an independently decodable frame which has been encoded using information only from within itself. In contrast, a conventional "P-frame" or predictively encoded frame, is not an I-frame. In some video and audio codec formats, such independently decodable frames are not officially defined (or conventionally referred to) as "I-frames." However, independently decodable frames which are generated in accordance with such codecs are nevertheless referred to herein (including in the claims) as "I-frames." In some codecs, every video frame and/or every audio frame is independently decodable, and thus each such frame would be referred to herein as an "I-frame."

A transport stream generated in accordance with an embodiment in the first class has at least the following perfect splicing property (which is sometimes referred to herein as the "essential" perfect splicing property):

for each program indicated by the transport stream, identical frame rates for video and encoded audio elementary streams of the program (i.e., for each program of the transport stream, each video elementary stream of the program has a frame rate which is the same as the frame rate of each encoded audio elementary stream of the program, and for each video frame of the program there is at least one corresponding encoded audio frame of the program); and I-frame synchronization (i.e., video and audio encoding are synchronized such that for each program of the transport stream, for each video I-frame in a video elementary stream of the program, there is at least one matching audio I-frame (i.e., at least one audio I-frame synchronized with the video I-frame) in an audio elementary stream of the program).

A transport stream generated in accordance with an embodiment in the first class may be indicative of a program or two or more programs. Each program includes frames of video data (including I-frames) which determine a video elementary stream, and frames of corresponding encoded audio data (including I-frames) which determine at least one audio elementary stream. Each transport stream generated in accordance with an embodiment in the first class is said to have (i.e., satisfy) an essential perfect splicing property (e.g., the essential perfect splicing property) in the sense that, for each program indicated by the transport stream, data of the transport stream which is indicative of the program has the perfect splicing property.

A transport stream generated in accordance with an embodiment in the first class has the following characteristics:

1. perfect A/V sync can be maintained when splicing the transport stream using any transport stream splicer, without modification by the splicer of any encoded audio elementary stream of the transport stream; and 2. splicing of the transport stream (even simple splicing of the transport stream by a splicer having low sophistication) is possible without damaging encoded audio content of the transport stream or disturbing A/V sync.

In addition to the essential perfect splicing property defined above (identical frame rates for video and encoded audio, and I-frame synchronization), a transport stream generated in accordance with an embodiment in the first class may have at least one additional perfect splicing property (e.g., one or more of the perfect splicing properties described below). The option to generate the transport stream to satisfy at least one such additional perfect splicing property allows the transport stream creator (e.g., a network operator) to choose which perfect splicing property or properties should be satisfied. Satisfaction of more perfect splicing properties typically requires more overhead for transport stream generation but allows use of simpler splicer implementations. Generation of a transport stream to have fewer perfect splicing properties typically allows simpler transport stream generation but requires more complex splicer implementations. Typically, a transport stream generator is free to choose whether to generate a transport stream to satisfy a greater or lesser number of perfect splicing properties (in accordance with embodiments of the invention) to achieve a desired tradeoff between complexity of transport stream generation, and splicer implementation complexity, rather than being forced to accept a particular mode of usage. Whether it is desirable or required for a transport stream to satisfy a particular perfect splicing property depends on the features of the splicer which is (or splicers which are) contemplated for use to splice the transport stream. Very elaborate splicers will typically require fewer of the perfect splicing properties, while very simple splicers may require transport streams with more perfect splicing properties.

Because a transport stream generated in accordance with an embodiment in the first class satisfies the essential perfect splicing property, a splicer can seamlessly splice the transport stream without modifying any audio elementary stream of any program of the transport stream. However, the splicer may need to perform re-multiplexing or other modification of the transport stream in order to perform the seamless splice (e.g., a sequence of packets which comprise an audio elementary stream may need to be re-multiplexed with other packets of the transport stream, to generate the spliced transport stream). The splicer may also need to perform the splice (to generate a spliced transport stream) in such a manner as to prevent underflow or overflow of buffers of a receiver (e.g., a downstream decoder) which receives the spliced transport stream. The splicer's task can be simplified by generating each transport stream to be spliced to have one or more additional perfect splicing properties (in addition to the above-defined essential perfect splicing property). Thus, in some embodiments, the invention is a method for generating a transport stream (e.g., an MPEG-2 transport stream) which satisfies the essential perfect splicing property, and which also satisfies at least one of the following additional perfect splicing properties:

1. PES alignment of A/V I-frames. A transport stream has this property if, for each program of the transport stream, each video I-frame in a video elementary stream of the program is PES packet aligned with an encoded audio I-frame of the program (i.e., the first byte of the encoded audio I-frame is at the start of a new PES packet, and the first byte of the video I-frame is at the start of a new PES packet). The following encoded audio frames of the program, until the start of the next matching I-Frame, do not need to be PES packet aligned;

2. A/V I-frame pair PTS values match. A transport stream has this property if, for each program of the transport stream, for each video I-frame there is at least one matching audio I-frame (as prescribed in the I-frame synchronization requirement of the essential perfect splicing property, and where each I-frame pair comprising one said video I-frame and an audio I-frame which matches the video I-frame is sometimes referred to herein as an "A/V I-frame pair"), and the I-frames of each A/V I-frame pair have matching (e.g., identical) presentation time stamp (PTS) values;

3. Constant hyperframe bitrate. Herein, the term "hyperframe" denotes a sequence of audio frames starting with an audio I-frame of an A/V-I-frame pair (of a program of a transport stream) and ending with the audio frame just previous to the next A/V I-frame pair (of the program). A transport stream has a "constant hyperframe bitrate" perfect splicing property if, for each program of the transport stream, the average bit rate for every hyperframe is constant. Note that constant bit rate (CBR) is a special case of the "constant hyperframe bitrate" property, and that the "constant hyperframe bitrate" property ensures that the receiver buffer(s) do not overflow or underflow after splices when streams having equal encoded audio bit rates are spliced together;

4. Data alignment in transport stream. A transport stream has a "data alignment in transport stream" perfect splicing property if, for each program of the transport stream, the sequence of A/V frames that comprises an A/V I-Frame pair and the A/V frames that follow up to the next A/V I-Frame pair is multiplexed into the transport stream so it is sent together (i.e., time-multiplexed to occur in a single, continuous segment of the transport stream);

5. Guard bands in transport stream. A transport stream has a "guard bands in transport stream" perfect splicing property if, for each program of the transport stream, for each A/V I-frame pair of the program, sending of transport stream packets carrying the encoded audio data of said A/V I-frame pair does not start before the sending of transport stream packets carrying the video data of said A/V I-frame pair has started. Also, for an audio frame that occurs just before each A/V I-frame pair of the program, all audio data transport stream packets for said audio frame are sent before the sending of the last video data transport stream packet that precedes the A/V I-frame pair. An important benefit of such guard bands is to ensure that transport stream splicers which are implemented to look only at video to decide where to splice will never damage any audio frames; and 6. Splice points marked in transport stream. A transport stream has a "splice points marked in transport stream" perfect splicing property if the transport stream includes metadata which explicitly indicates suitable splice points (e.g. as described in Annex A of ISO/IEC 13818-1) in the transport stream, and the metadata indicates only splice points which occur just before suitable A/V I-Frame pairs. Such indicated splice points are potential seamless splice points in the transport stream. Optionally, the format of the video may imply further requirements for seamless splice points (e.g., depending on the format of the video encoding used to generate the transport stream, not every video I-Frame may be suitable as a seamless splice point), and the metadata indicates (as suitable splice points) only splice points which occur just before suitable A/V I-Frame pairs and which also satisfy such further requirements.

Typically, a transport stream which has the sixth additional perfect splicing property ("splice points marked in transport stream") also has each of the first through fifth additional perfect splicing properties, a transport stream which has the fifth additional perfect splicing property ("guard bands in transport stream") also has each of the first through fourth additional perfect splicing properties, a transport stream which has the fourth additional perfect splicing property ("data alignment in transport stream") also has each of the first through third additional perfect splicing properties, a transport stream which has the third additional perfect splicing property ("constant hyperframe bitrate") also has each of the first and second additional perfect splicing properties, and a transport stream which has the second additional perfect splicing property ("A/V I-frame pair PTS values match") also has the first additional perfect splicing property.

A transport stream (e.g., an MPEG-2 transport stream) generated in accordance with some embodiments in the first class of embodiments includes metadata ("splicing metadata") indicative of whether the transport stream (or a program indicated thereby) has at least one perfect splicing property (e.g., metadata indicative of whether the transport stream or program has the essential perfect splicing property and each of the additional perfect splicing properties).

In a second class of embodiments, the invention is a method for generating a transport stream (e.g., an MPEG-2 transport stream), which is indicative of at least one audio/video program ("program"), and includes metadata ("splicing metadata") indicative of whether the program has a perfect splicing property (e.g., metadata indicative of whether the program has an essential perfect splicing property and/or at least one other perfect splicing property). If the transport stream is indicative of at least two programs, the splicing metadata may be indicative of whether each of the programs has a perfect splicing property (e.g., whether or not each individual one of the programs has the perfect splicing property). The splicing metadata may be collectively indicative of (i.e., pertain to) all programs indicated by the transport stream (and thus may be indicative of whether the transport stream itself has the perfect splicing property), or may be specifically indicative of each individual program (or a subset of all the programs) indicated by the transport stream.

The splicing metadata of a transport stream generated in accordance with an embodiment in the second class may be indicative of whether at least one program (e.g., each program) indicated by the transport stream has the "essential" perfect splicing property (defined above with reference to the first class of embodiments) and/or whether at least one program indicated by the transport stream has at least one additional perfect splicing property (of any the types defined above with reference to the first class of embodiments).

With reference to the second class of embodiments, the expression that a program indicated by a transport stream "has" (i.e., satisfies) a perfect splicing property denotes that data of the transport stream which is indicative of the program (e.g., frames of video data, including I-frames of video data, which determine at least one video elementary stream of the program and frames of encoded audio data, including I-frames of encoded audio data, which determine at least one audio elementary stream of the program) has the perfect splicing property (e.g., other data of the transport stream, indicative of at least one other program, may not have the perfect splicing property).

A transport stream generated in accordance with a typical embodiment in the second class includes (for each program indicated by the transport stream) frames of video data (which determine at least one video elementary stream for the program) and frames of encoded audio data (which determine at least one audio elementary stream for the program). The frames of video data include I-frames of video data, and the frames of encoded audio data include I-frames of encoded audio data.

Data (in a transport stream generated in accordance with an embodiment in the second class) indicative of a program of the transport stream may have the above-defined essential perfect splicing property and may also have one or more of the additional perfect splicing properties described above.

The option to generate the data (indicative of the program) to satisfy at least one such additional perfect splicing property allows the transport stream creator to choose which perfect splicing property or properties should be satisfied. Satisfaction of more perfect splicing properties typically requires more overhead for transport stream generation but allows use of simpler splicer implementations.

Inclusion of splicing metadata in a transport stream (indicative of whether a program indicated by the transport stream satisfies each of at least one perfect splicing property) enables a splicer to parse such metadata from the transport stream to determine whether data (of the transport stream) which is indicative of the program's elementary streams can be spliced (and otherwise processed) in an expected manner, and to issue warnings to the operator if a transport stream (or data thereof which is indicative of elementary streams of a program) does not conform to what is supported by that splicer (e.g., has less than a full set of perfect splicing properties, where the full set is needed for the splicer to perform a splice which is guaranteed to be a perfect splice).

A transport stream generated in accordance with an embodiment in the second class to be indicative of least two programs may include splicing metadata for each of the programs. The splicing metadata for each program may be indicative of whether the program satisfies at least one perfect splicing property. For example, the splicing metadata may indicate whether the program satisfies each of the essential perfect splicing property and the six additional perfect splicing properties defined herein.

As noted, a transport stream may be indicative of multiple programs. Each program may include multiple elementary streams (e.g., a video elementary stream, and one or more encoded audio elementary streams). Typically, each elementary stream has an associated descriptor (sometimes referred to herein as an "elementary stream descriptor") that includes information characterizing or otherwise related to the elementary stream. By analyzing the descriptor of each elementary stream, splicers can determine whether the transport stream (or a program thereof) has properties they require to implement splicing (and optionally issue a warning or error upon determining that at least one expected property is not satisfied). The splicing metadata included in a transport stream in accordance with typical embodiments of the invention may be included in elementary stream descriptors of the transport stream (and may be indicative of each perfect splicing property of the program which includes the elementary stream). Alternatively, the splicing metadata may be included in other parts (segments) of the transport stream (and may be indicative collectively of all programs of the transport stream, or individually indicative of each program of the transport stream.

In typical embodiments, a transport stream includes splicing metadata for each program of the transport stream, the splicing metadata for each program indicates each perfect splicing property satisfied by the elementary stream(s) of the program, and the elementary stream(s) of each program indicated by the transport stream may satisfy (or fail to satisfy) a different set of perfect splicing properties. For example, a transport stream generated in accordance with an embodiment in the second class may include (i.e., may include data indicative of) a program with one video elementary stream and two audio elementary streams. In this example, the data of the transport stream which determines the program may have a perfect splicing property, and the transport stream may include splicing metadata (for the program) which indicates the perfect splicing property satisfied by the elementary streams of the program.

Examples of splicing metadata included in a transport stream generated in accordance with an embodiment in the second class include (or consist of) all or some of:

metadata indicative of whether at least one program of the transport stream (i.e., data, of the transport stream, which is indicative of each said program) satisfies the property of identical frame rates for video and encoded audio (for example, a framerate_match bit in a descriptor of the transport stream is set (to a "one" value) if the identical frame rate property is satisfied. Otherwise, such bit remains unset (as a "zero" value));

metadata indicative of whether at least one program of the transport stream satisfies the I-frame synchronization property (for example, an iframes_synced bit in the descriptor of the transport stream is set (to a "one" value) if the I-frame synchronization property is satisfied. Otherwise, such bit remains unset (as a "zero" value));

metadata indicative of whether at least one program of the transport stream satisfies the "PES Alignment of A/V I-frames" perfect splicing property. For example, the splicing metadata may be a bit in a descriptor of the transport stream (i.e., an iframes_pes_aligned bit) for each program of the transport stream which satisfies the property. Such an iframes_pes_aligned bit would be set (to a "one" value) if the property is satisfied for the program. Otherwise, the bit would remain unset (as a "zero" value);

metadata indicative of whether at least one program of the transport stream satisfies the "A/V I-frame pair PTS values match" perfect splicing property. For example, the splicing metadata may be a bit in a descriptor of the transport stream (i.e., an iframes_pts_match bit) for each program of the transport stream which satisfies the property. Such an iframes_pts_match bit would be set (to a "one" value) if the property is satisfied for the program. Otherwise, the bit would remain unset;

metadata indicative of whether at least one program of the transport stream satisfies the "constant hyperframe bitrate" perfect splicing property. For example, the splicing metadata may be a bit in a descriptor of the transport stream (i.e., a constant_hyperframe_bitrate bit) for each program of the transport stream which satisfies the property. Such a constant_hyperframe_bitrate bit would be set (to a "one" value) if the property is satisfied for the program. Otherwise, the bit would remain unset (as a "zero" value);

metadata indicative of whether at least one program of the transport stream satisfies the "data alignment in transport stream" perfect splicing property. For example, the splicing metadata may be a bit in a descriptor of the transport stream (i.e., an avdata_aligned bit) for each program of the transport stream which satisfies the property. Such an avdata_aligned bit would be set (to a "one" value) if the property is satisfied for the program. Otherwise, the bit would remain unset (as a "zero" value);

metadata indicative of whether at least one program of the transport stream satisfies the "guard bands in transport stream" perfect splicing property. For example, the splicing metadata may be a bit in a descriptor of the transport stream (i.e., a guardband bit) for each program of the transport stream which satisfies the property. Such a guardband bit would be set (to a "one" value) if the property is satisfied for the program. Otherwise, the bit would remain unset (as a "zero" value); and/or metadata indicative of whether at least one program of the transport stream satisfies the "splice points marked in transport stream" perfect splicing property. For example, the splicing metadata may be a bit in a descriptor of the transport stream (i.e., a splicemarkers bit) for each program of the transport stream which satisfies the property. Such a splicemarkers bit would be set (to a "one" value) if the property is satisfied for the program. Otherwise, the bit would remain unset (as a "zero" value).

In the above example in which the splicing metadata for a program includes a framerate_match bit and an iframes_synced bit, if both such bits are set (both have the logical value "one"), the splicing metadata indicates that the program satisfies the essential perfect splicing property (in that it has identical frame rates for video and encoded audio, and satisfies the I-frame synchronization property).

In some embodiments, the invention is a method for splicing a transport stream (e.g., an MPEG-2 transport stream) having the essential perfect splicing property, thereby generating a spliced transport stream without modifying any encoded audio elementary stream of the transport stream. Optionally, the transport stream also includes at least one of the above-described additional perfect splicing properties (e.g., the stream may have the essential perfect splicing property, and all of the additional perfect splicing properties). Since the transport stream has the essential perfect splicing property, the splicing is performed such that audio/video synchronization in the transport stream is maintained in the spliced transport stream.

In some embodiments, the invention is a method for splicing a transport stream (e.g., a MPEG-2 transport stream) which has been generated, in accordance with any embodiment in the second class, to include splicing metadata. The method includes steps of: (a) parsing at least a portion of the transport stream to identify the splicing metadata (e.g., splicing metadata in elementary stream descriptors of the transport stream); and (b) upon determining that the splicing metadata indicates that at least a segment of the transport stream (e.g., the entire transport stream, or a program indicated by the transports stream) has at least one perfect splicing property, including an essential perfect splicing property, splicing the transport stream without modifying any encoded audio elementary stream of the transport stream, thereby generating a spliced transport stream. If the transport stream (or a segment thereof which is spliced) has the essential perfect splicing property, step (b) is performed such that audio/video synchronization in the transport stream is maintained in the spliced transport stream.

Another aspect of the invention is an audio/video processing unit (AVPU) configured to perform any embodiment of the inventive method (e.g., generation or splicing of a transport stream having the essential perfect splicing property and/or including splicing metadata). For example, the AVPU may be a splicer configured to perform any embodiment of the inventive transport stream splicing method. In another class of embodiments, the invention is an AVPU including a buffer memory (buffer) which stores (e.g., in a non-transitory manner) at least one segment of a transport stream which has been generated by any embodiment of the inventive method (e.g., a transport stream which satisfies, and for which the stored segment satisfies, at least the essential perfect splicing property defined herein and optionally also at least one additional perfect splicing property of any type defined herein). The segment stored in the buffer may include splicing metadata (which has been included in the transport stream in accordance with any embodiment of the inventive method). Examples of AVPUs include, but are not limited to encoders (e.g., transcoders), decoders (e.g., decoders configured to decode content of a transport stream, and/or to perform splicing to generate a spliced transport stream and to decode content of the spliced transport stream), codecs, splicers, pre-processing systems (pre-processors), post-processing systems (post-processors), transport stream processing systems, and combinations of such elements.

Aspects of the invention include a system or device configured (e.g., programmed) to perform any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

NOTATION AND NOMENCLATURE

Figure 1:
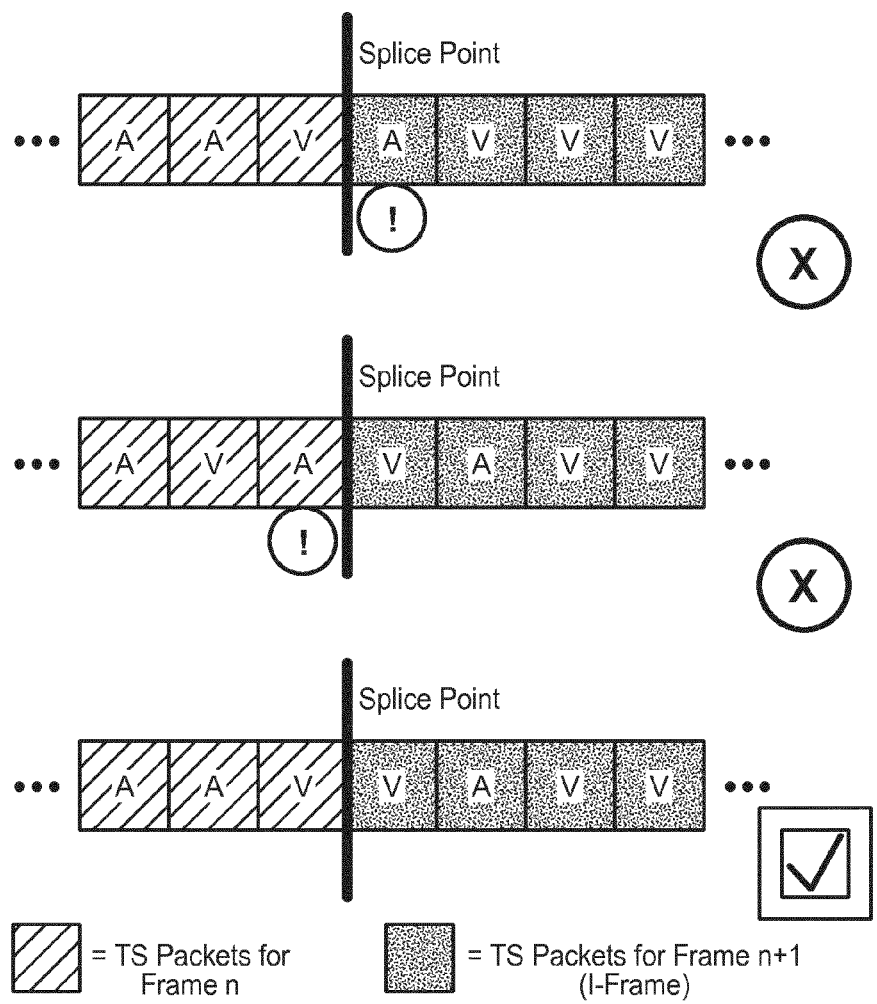
FIG. 1 is a diagram of three splice points, each in a different transport stream. Each transport stream includes a different sequence of TS packets (with those TS packets which include encoded audio data labeled with an "A" and those TS packets which include video data labeled with a "V").

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements encoding may be referred to as an encoder system, and a system including such a subsystem (e.g., a system that generates X output signals in response to multiple inputs, in which the subsystem generates M of the inputs and the other X-M inputs are received from an external source) may also be referred to as an encoder system.

Throughout this disclosure including in the claims, the expression "transport stream" (or "transport stream") denotes a signal indicative of a bitstream, said bitstream including video data and encoded audio data, and optionally also metadata. The expression "AV data" is sometimes used herein to denote such video data and/or such encoded audio data. Typically, a transport stream is a signal indicative of a serial bitstream including a sequence of segments (e.g., packets) of encoded audio data, segments (e.g., packets) of video data, and segments (e.g., headers or other segments) of metadata (e.g., including metadata which supports splicing). A transport stream may be indicative of multiple programs, and each program may include multiple elementary streams (e.g., a video elementary stream, and two or more audio elementary streams). Typically, each elementary stream of a transport stream has an associated descriptor that includes information related to the elementary stream.

Throughout this disclosure including in the claims, the term "processor" is used in a broad sense to denote a system or device programmable or otherwise configurable (e.g., with software or firmware) to perform operations on data (e.g., audio, and/or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expression "audio video receiver" (or "AVR") denotes a receiver in a class of consumer electronics equipment used to control playback of audio and video content, for example in a home theater.

Throughout this disclosure including in the claims, the expressions "audio/video processing unit" (or "AV processing unit" or "AVPU") and "AV processor" are used interchangeably, and in a broad sense, to denote a system configured to process a transport stream (or video data and/or encoded audio data of a transport stream). Examples of AV processing units include, but are not limited to encoders (e.g., transcoders), decoders, codecs, splicers, preprocessing systems, post-processing systems, and bitstream processing systems (sometimes referred to as bitstream processing tools). In one example, an AV processing unit is a splicer configured to determine an out point (i.e., time) of a first transport stream and an in point (i.e., another time) of a second transport stream (which can be the first transport stream, or a different transport stream which is not the first transport stream), and to generate a spliced transport stream (e.g., a spliced transport stream which includes data of the first bitstream occurring prior to the out point and data of the second bitstream occurring after the in point).

Throughout this disclosure including in the claims, the expression "metadata" (e.g., as in the expression "splicing metadata") refers to separate and different data from corresponding audio data and/or video data (audio and/or video content of a bitstream which also includes metadata). Metadata is associated with audio and/or video data ("AV" data), and indicates at least one feature or characteristic of the AV data (e.g., what type(s) of processing have already been performed, or should be performed, on the AV data, or the trajectory of an object indicated by audio data of the AV data). The association of the metadata with the AV data is time-synchronous. Thus, present (most recently received or updated) metadata may indicate that the corresponding AV data contemporaneously has an indicated feature and/or comprises the results of an indicated type of audio and/or video data processing.

Throughout this disclosure including in the claims, the expression "splicing metadata" denotes metadata which is indicative of whether a corresponding transport stream (typically a transport stream in which the metadata is included), or a program indicated by such transport stream, satisfies each of at least one perfect splicing property (e.g., whether the transport stream satisfies each of at least two perfect splicing properties). For example, splicing metadata of a transport stream may indicate that the transport stream (or a program, or each of each of at least two programs, indicated by data of the transport stream) satisfies at least one perfect splicing property (e.g., each of at least two perfect splicing properties).

Throughout this disclosure including in the claims, the term "couples" or "coupled" is used to mean either a direct or indirect connection. Thus, if a first device couples to a second device, that connection may be through a direct connection, or through an indirect connection via other devices and connections.

DETAILED DESCRIPTION OF EXEMPLARY EMBODIMENTS OF THE INVENTION

Figure 3:
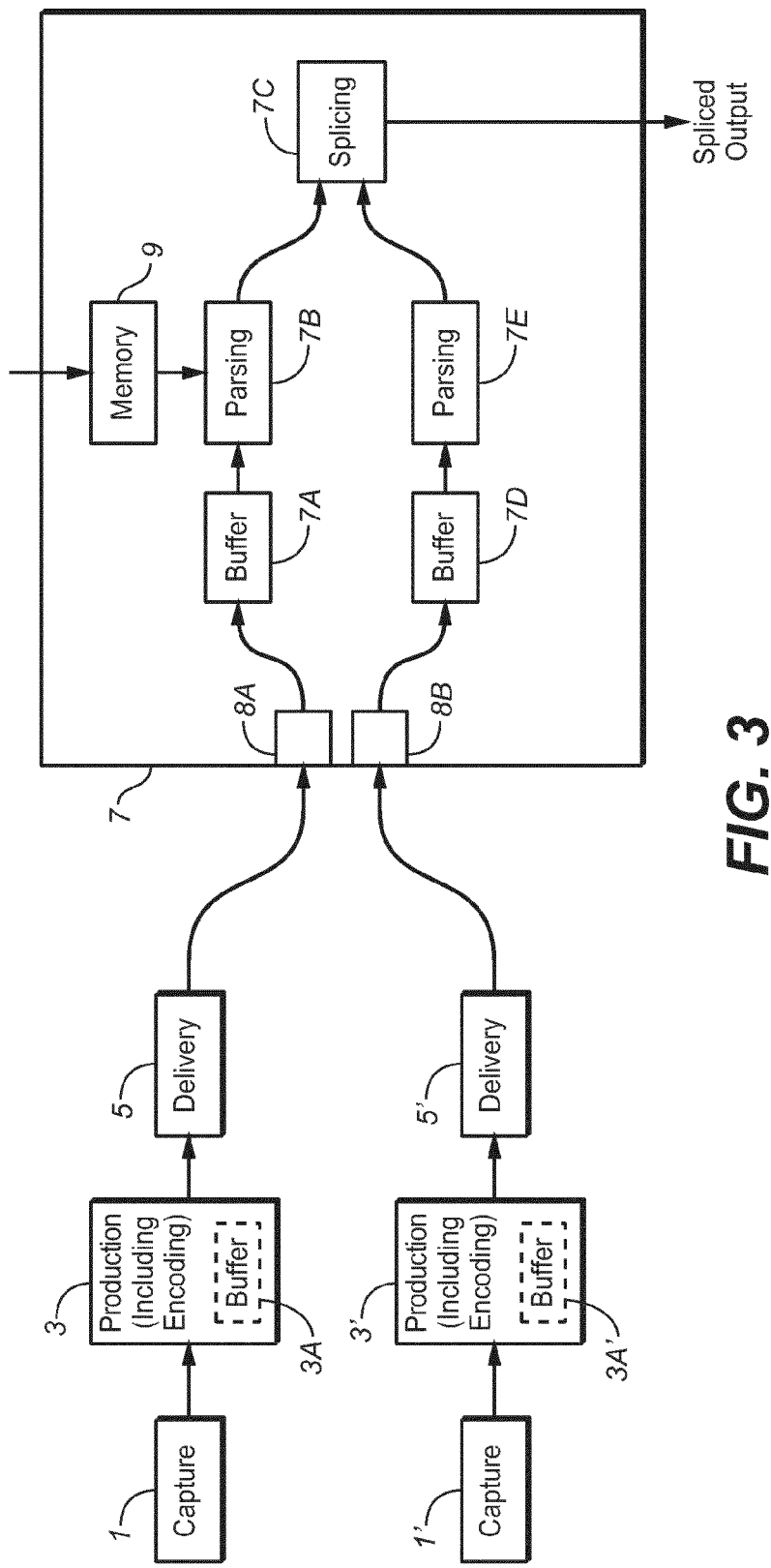
FIG. 3 is a block diagram of an embodiment of a system, in which one or more of the elements of the system may be configured in accordance with an embodiment of the invention.

FIG. 3 is a block diagram of an example of an audio processing chain (audio data processing system), in which one or more of the elements of the system may be configured in accordance with an embodiment of the present invention. The system includes the following elements, coupled together as shown: capture unit 1, production unit 3 (which includes an encoding subsystem), delivery subsystem 5, and splicing unit (splicer) 7. In variations on the system shown, one or more of the elements are omitted, or additional processing units are included.

Capture unit 1 is typically configured to generate PCM (time-domain) samples comprising audio content, and video data samples, and to output the PCM audio samples and video data samples. For example, the PCM samples may be indicative of multiple streams of audio captured by microphones. Production unit 3, typically operated by a broadcaster, is configured to accept the PCM audio samples and video samples as input, and to generate and output a transport stream indicative of the audio and video content. In typical implementations of the FIG. 3 system, production unit 3 is configured to output an MPEG-2 transport stream (e.g., an MPEG-2 transport stream whose audio content is encoded in accordance with the AC-4 standard, so that each audio elementary stream of the MPEG-2 transport stream comprises compressed audio data having AC-4 format). In some implementations in which production unit 3 is configured to perform an embodiment of the inventive method, the transport stream (e.g., MPEG-2 transport stream) output from unit 3 is also indicative of (i.e., includes) splicing metadata of any of the types described herein which are generated in accordance with an embodiment of the invention.

The encoding performed on the audio content of a transport stream (e.g., an MPEG-2 transport stream) generated in accordance with any of various embodiments of the invention may be AC-4 encoding, or it may be any other audio encoding that is frame-aligned with video (i.e. so that each frame of video corresponds to an integer (i.e., non-fractional) number of frames of encoded audio (AC-4 encoding can be performed so as to have this latter property).

The transport stream output from unit 3 may include an encoded (e.g., compressed) audio bitstream (sometimes referred to herein as a "main mix") indicative of at least some of the audio content, and a video bitstream indicative of the video content, and optionally also at least one additional bitstream or file (sometimes referred to herein as a "side mix") indicative of some of the audio content. The data of the transport stream (and of each generated side mix, if any is generated) that are indicative of the audio content are sometimes referred to herein as "audio data."

Audio data of the transport stream (e.g., the main mix thereof) may be indicative of one or more sets of speaker channels, and/or streams of audio samples indicative of object channels.

Figure 4:
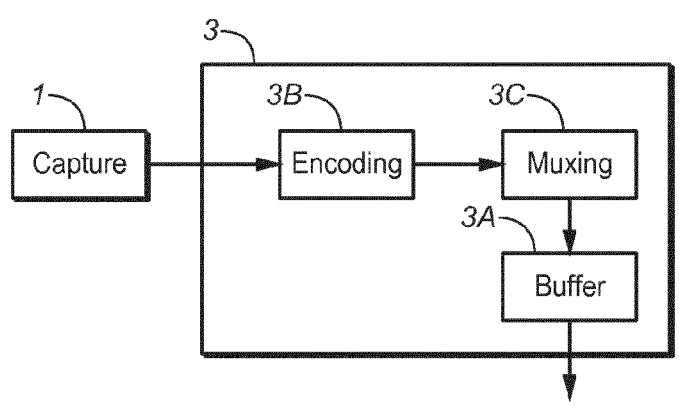
FIG. 4 is a block diagram of a system which is an implementation of capture unit 1 and production unit 3 of FIG. 3.

As shown in FIG. 4, an implementation of production unit 3 of FIG. 3 includes an encoding subsystem 3B which is coupled to receive video and audio data from unit 1. Subsystem 3B is configured to perform necessary encoding on the audio data (and optionally also on the video data) to generate encoded audio data and optionally also encoded video data. Multiplexing subsystem 3C of unit 3 (of FIG. 4) is coupled and configured to package (including by packetizing and multiplexing) the output of subsystem 3B as a transport stream (e.g., an MPEG-2 transport stream, whose audio content may be encoded in accordance with the AC-4 standard so that each audio elementary stream of the MPEG-2 transport stream comprises compressed audio data having AC-4 format). In some implementations in which unit 3 (of FIG. 4) is configured to perform an embodiment of the inventive method, subsystem 3C is configured to include in the transport stream (e.g., MPEG-2 transport stream) splicing metadata of any of the types described herein which are generated in accordance with an embodiment of the invention. In typical implementations in which unit 3 (of FIG. 4) is configured to perform an embodiment of the inventive method, subsystem 3C is configured to generate the transport stream (e.g., MPEG-2 transport stream) to satisfy the essential perfect splicing property (defined herein) and optionally also at least one additional perfect splicing property. Segments of the transport stream generate in subsystem 3C are buffered (stored in a non-transitory manner) in buffer 3A, and the transport stream is asserted to delivery subsystem 5.

Delivery subsystem 5 of FIG. 3 is configured to store and/or transmit (e.g., broadcast) the transport bitstream generated by unit 3 (e.g., including each side mix thereof, if any side mix is generated).

Capture unit 1', production unit 3' (including buffer 3A'), and delivery subsystem 5' are identical, respectively, to capture unit 1, production unit 3, and delivery subsystem 5'. They may operate to generate (and deliver to input 8B of splicer 7) a second transport stream (generated in accordance with an embodiment of the invention), to be spliced by splicer 7 with a first transport stream which is generated (also in accordance with an embodiment of the invention) in production unit 3 and delivered to input 8A of splicer 7.

Splicer 7 of FIG. 3 includes inputs 8A and 8B. Input 8A is coupled to receive (e.g., read) at least one transport stream delivered to splicer 7 by delivery subsystem 5, and input 8B is coupled to receive (e.g., read) at least one transport stream delivered to splicer 7 by delivery subsystem 5'. Splicer 7 also includes buffer memory (buffer) 7A, buffer memory (buffer) 7D, parsing subsystem 7E, parsing subsystem 7B, and splicing subsystem 7C, coupled as shown in FIG. 3. Optionally, parsing subsystems 7B and 7E are omitted (for reasons explained below), in which case the outputs of buffers 7A and 7D and optionally also memory 9 are coupled directly to splicing subsystem 7C. Optionally, splicer 7 includes a memory 9 which is coupled (as shown) and configured to store a transport stream to be spliced. During typical operation of splicer 7, segments of at least one selected transport stream received at input 8A and/or 8B (e.g., a sequence of segments of a selected sequence of transport streams received at inputs 8A and 8B) are buffered (stored in a non-transitory manner) in buffer 7A and/or buffer 7D. Buffered segments are asserted from buffer 7A to parsing subsystem 7B for parsing, and buffered segments are asserted from buffer 7D to parsing subsystem 7E. Alternatively, segments of at least one transport stream stored in memory 9 are asserted to parsing subsystem 7B for parsing (or segments of a selected sequence of transport streams stored in memory 9 and/or received at input 8A are asserted from buffer 7A and/or memory 9 to parsing subsystem 7B for parsing). Typically, each transport stream to be parsed (in subsystem 7B or 7E) and spliced (in splicing subsystem 7C) has been generated in accordance with an embodiment of the invention.

If splicing metadata (indicative of whether a program indicated by a transport stream satisfies each of at least one perfect splicing property) is included (in accordance with an embodiment of the invention) in a transport stream (or at least one segment thereof) asserted to parsing subsystem 7B, subsystem 7B is configured and operable to parse such metadata from the transport stream (or segment) to determine whether data (of the transport stream) which is indicative of the program's elementary streams can be spliced (and otherwise processed) in an expected manner, and typically also to issue warnings to an operator if a transport stream (or data thereof which is indicative of a program's elementary streams) does not conform to what is supported by splicer 7.

If splicing metadata (indicative of whether a program indicated by a transport stream satisfies each of at least one perfect splicing property) is included (in accordance with an embodiment of the invention) in a transport stream (or at least one segment thereof) asserted to parsing subsystem 7E, subsystem 7E is configured and operable to parse such metadata from the transport stream (or segment) to determine whether data (of the transport stream) which is indicative of the program's elementary streams can be spliced (and otherwise processed) in an expected manner, and typically also to issue warnings to an operator if a transport stream (or data thereof which is indicative of a program's elementary streams) does not conform to what is supported by splicer 7.

In some cases (e.g., when transport streams to be spliced by splicer 7 have been generated in accordance with an embodiment in the first class, to have the "essential" perfect splicing property defined herein and optionally also at least one additional perfect splicing property), parsing subsystems 7B and 7E may be omitted. When parsing subsystems 7B and 7E are omitted, an implementation of splicer 7 can execute perfect splicing on transport streams which have been generated (in accordance with an embodiment in the first class) to have the "essential" perfect splicing property and any additional perfect splicing property required by the relevant implementation of splicer 7 in order to execute perfect splicing.

Splicer 7 (e.g., subsystems 7B and 7E and/or subsystem 7C thereof) is also coupled and configured to determine splice points in each transport stream to be spliced (e.g., a first transport stream delivered to splicer 7 by delivery subsystem 5 and/or a second transport stream delivered to splicer 7 by delivery subsystem 5', or a first transport stream stored in memory 9 and/or a second transport stream delivered to splicer 7 by delivery subsystem 5 or 5') and subsystem 7C is configured to splice the stream(s) to generate at least one spliced transport stream (the "spliced output" of FIG. 3). In some cases, the splice omits a segment of a single transport stream, and splicer 7 is configured to determine an out point (i.e., a time) of the transport stream and an in point (a later time) of the transport stream, and to generate the spliced transport stream by concatenating the stream segment occurring prior to the out point with the stream segment occurring after the in point. In other cases, the splice inserts a second transport stream between segments of a first transport stream (or between segments of first transport stream and a third transport stream), and splicer 7 is configured to determine an out point (i.e., time) of the first transport stream, an in point (a later time) of the first (or third) transport stream, an in point (i.e., a time) of the second transport stream, and an out point (a later time) of the second transport stream, and to generate a spliced transport stream which includes data of the first transport stream occurring prior to that stream's out point, data of the second transport stream occurring between that stream's in point and out point, and data of the first (or third) transport stream occurring after the first (or third) transport stream's in point.

In some implementations, splicer 7 is configured to splice transport stream(s), each of which has been generated in accordance with an embodiment of the invention, in accordance with an embodiment of the inventive splicing method to generate the at least one spliced transport stream (the "spliced output" of FIG. 3).

Typically, a playback system would decode and render a spliced transport stream output from splicer 7. The playback system would typically include a subsystem for parsing the audio content and the video content of the transport stream, a subsystem configured to decode and render the audio content, and another subsystem configured to decode and render the video content.

In a first class of embodiments, the invention is a method for generating (e.g., in production unit 3 of FIG. 3) a transport stream (e.g., an MPEG-2 transport stream), including by packaging encoded audio data (sometimes referred to herein as "CA") and video data in the transport stream such that the transport stream has at least one perfect splicing property (i.e., the "essential" perfect splicing property defined herein, and optionally also at least one of the additional perfect splicing properties defined herein). These additional perfect splicing properties are: the "PES alignment of A/V I-frames" perfect splicing property, the "A/V I-frame pair PTS values match" perfect splicing property, the "constant hyperframe bitrate" perfect splicing property, the "data alignment in transport stream" perfect splicing property, the "guard bands in transport stream" perfect splicing property, the "splice points marked in transport stream" perfect splicing property). The "essential" perfect splicing property guarantees that audio/video synchronization ("A/V" sync) is maintained when splicing the transport stream (e.g., when splicing a segment, of the transport stream, indicative of a program which has the perfect splicing property) without the need for modification by the splicer of any encoded audio elementary stream of the transport stream.

A transport stream generated in accordance with an embodiment in the first class is indicative of at least one audio/video program ("program"), and includes (for each program indicated thereby) frames of video data (which determine at least one video elementary stream) and frames of corresponding encoded audio data (which determine at least one audio elementary stream). The frames of video data (e.g., video frames #1, #2, #3, #4, #5, and #6 of FIG. 2) include I-frames of video data (e.g., video I-frames #1 and #5 of FIG. 2), and the frames of encoded audio data (e.g., the audio frames identified as AC-4 frame #1, AC-4 frame #2, AC-4 frame #3, AC-4 frame #4, AC-4 frame #5, and AC-4 frame #6 of FIG. 2) include I-frames of encoded audio data (e.g., audio I-frames AC-4 frame #1, AC-4 frame #3, and AC-4 #5 of FIG. 2), where "I-frame" denotes an independently decodable frame which has been encoded using information only from within itself. In contrast, a "P-frame" (predictively encoded frame) is not an I-frame.

The transport stream has at least the following perfect splicing property (which is sometimes referred to herein as the "essential" perfect splicing property):

for each program indicated by the transport stream, identical frame rates for video and encoded audio elementary streams of the program (i.e., for each program of the transport stream, each video elementary stream of the program has a frame rate which is the same as the frame rate of each encoded audio elementary stream of the program, and for each video frame of the program there is at least one corresponding encoded audio frame of the program); and I-frame synchronization (i.e., video and audio encoding are synchronized such that for each program of the transport stream, for each video I-frame in a video elementary stream of the program, there is at least one matching audio I-frame (i.e., at least one audio I-frame synchronized with the video I-frame) in an audio elementary stream of the program).

Depending on the workflow employed (e.g., by production unit 3 of FIG. 3) to generate the transport stream, achieving the identical frame rate property (for a program indicated by the transport stream) may require re-encoding of at least one elementary stream of the program when the frame rate of another elementary stream of the program has changed, so that the frame rates of the elementary streams (after the re-encoding) are the same. For example, an audio elementary stream may need to be re-encoded when a corresponding video elementary stream's frame rate has been changed. Usually, the need for such re-encoding can be avoided by choosing a suitable workflow to implement generation of the transport stream.

A transport stream generated in accordance with an embodiment in the first class may be indicative of a program or two or more programs. Each program includes frames of video data (including I-frames) which determine a video elementary stream, and frames of corresponding encoded audio data (including I-frames) which determine at least one audio elementary stream. Each transport stream generated in accordance with an embodiment in the first class is said to have (i.e., satisfy) an essential perfect splicing property (e.g., the essential perfect splicing property) in the sense that, for each program indicated by the transport stream, data of the transport stream which is indicative of the program has the perfect splicing property.

A transport stream generated in accordance with an embodiment in the first class has the following characteristics:

1. perfect A/V sync can be maintained when splicing the transport stream using any transport stream splicer (e.g., splicer 7 of FIG. 3), without modification by the splicer of any encoded audio elementary stream of the transport stream; and 2. splicing of the transport stream (even simple splicing of the transport stream by a splicer having low sophistication) is possible without damaging encoded audio content of the transport stream or disturbing A/V sync.

In addition to the essential perfect splicing property defined above (identical frame rates for video and encoded audio, and I-frame synchronization), a transport stream generated in accordance with an embodiment in the first class may have at least one additional perfect splicing property (e.g., one or more of the perfect splicing properties described below). The option to generate the transport stream to satisfy at least one such additional perfect splicing property allows the transport stream creator (e.g., a network operator) to choose which perfect splicing property or properties should be satisfied. Satisfaction of more perfect splicing properties typically requires more overhead for transport stream generation but allows use of simpler splicer implementations. Generation of a transport stream to have fewer perfect splicing properties typically allows simpler transport stream generation but requires more complex splicer implementations. Typically, a transport stream generator is free to choose whether to generate a transport stream to satisfy a greater or lesser number of perfect splicing properties (in accordance with embodiments of the invention) to achieve a desired tradeoff between complexity of transport stream generation, and splicer implementation complexity, rather than being forced to accept a particular mode of usage. Whether it is desirable or required for a transport stream to satisfy a particular perfect splicing property depends on the features of the splicer which is (or splicers which are) contemplated for use to splice the transport stream. Very elaborate splicers will typically require fewer of the perfect splicing properties, while very simple splicers may require transport streams with more perfect splicing properties.

Because a transport stream generated in accordance with an embodiment in the first class satisfies the essential perfect splicing property, a splicer (e.g., splicer 7 of FIG. 3) can seamlessly splice the transport stream without modifying any audio elementary stream of any program of the transport stream. However, the splicer may need to perform re-multiplexing or other modification of the transport stream in order to perform the seamless splice (e.g., a sequence of packets which comprise an audio elementary stream may need to be re-multiplexed with other packets of the transport stream, to generate the spliced transport stream). The splicer may also need to perform the splice in such a manner as to prevent underflow or overflow of buffers of a receiver (e.g., a downstream decoder) which receives the spliced transport stream. The splicer's task can be simplified by generating each transport stream to be spliced to have one or more additional perfect splicing properties (in addition to the above-defined essential perfect splicing property). Thus, in some embodiments, the invention is a method for generating a transport stream (e.g., an MPEG-2 transport stream) which satisfies the essential perfect splicing property, and which also satisfies at least one of the following additional perfect splicing properties:

1. PES alignment of A/V I-frames. A transport stream has this property if, for each program of the transport stream, each video I-frame in a video elementary stream of the program is PES packet aligned with an encoded audio I-frame of the program (i.e., the first byte of the encoded audio I-frame is at the start of a new PES (Packetized Elementary Stream) packet, and the first byte of the video I-frame is at the start of a new PES packet). The following encoded audio frames of the program, until the start of the next matching I-Frame, do not need to be PES packet aligned. Examples of Packetized Elementary Stream (PES) packets are described with reference to FIG. 2, and the above description of MPEG-2 transport stream format refers to the PES packets of an MPEG-2 transport stream, and notes that each PES packet is typically encapsulated into a sequence of TS packets which are included in the MPEG-2 transport stream. An exemplary sequence of such TS packets is shown in the middle row of FIG. 2;

2. A/V I-frame pair PTS values match. A transport stream has this property if, for each program of the transport stream, for each video I-frame there is at least one matching audio I-frame (as prescribed in the I-frame synchronization requirement of the essential perfect splicing property, and where each I-frame pair comprising one said video I-frame and an audio I-frame which matches the video I-frame is sometimes referred to herein as an "A/V I-frame pair), and the I-frames of each A/V I-frame pair have matching (e.g., identical) presentation time stamp (PTS) values. The above description of MPEG-2 transport stream format refers to the PTS values of a conventional MPEG-2 transport stream, and notes that all TS packets that make up an audio or video frame (indicated by a PES packet) have the same PTS time stamp value;

3. Constant hyperframe bitrate. Herein, the term "hyperframe" denotes a sequence of audio frames starting with an audio I-frame of an A/V-I-frame pair (of a program of a transport stream) and ending with the audio frame just previous to the next A/V I-frame pair (of the program). A transport stream has a "constant hyperframe bitrate" perfect splicing property if, for each program of the transport stream, the average bit rate for every hyperframe is constant. Note that constant bit rate (CBR) is a special case of the "constant hyperframe bitrate" property, and that the "constant hyperframe bitrate" property ensures that the receiver buffer(s) do not overflow or underflow after splices when streams having equal encoded audio bit rates are spliced together;

4. Data alignment in transport stream. A transport stream has a "data alignment in transport stream" perfect splicing property if, for each program of the transport stream, the sequence of A/V frames that comprises an A/V I-Frame pair and the A/V frames that follow up to the next A/V I-Frame pair is multiplexed into the transport stream so it is sent together (i.e., time-multiplexed to occur in a single, continuous segment of the transport stream);

5. Guard bands in transport stream. A transport stream has a "guard bands in transport stream" perfect splicing property if, for each program of the transport stream, for each A/V I-frame pair of the program, sending of transport stream packets carrying the encoded audio data of said A/V I-frame pair does not start before the sending of transport stream packets carrying the video data of said A/V I-frame pair has started. Also, for an audio frame that occurs just before each A/V I-frame pair of the program, all audio data transport stream packets for said audio frame are sent before the sending of the last video data transport stream packet that precedes the A/V I-frame pair. An important benefit of such guard bands is to ensure that transport stream splicers which are implemented to look only at video to decide where to splice will never damage any audio frames; and 6. Splice points marked in transport stream. A transport stream has a "splice points marked in transport stream" perfect splicing property if the transport stream includes metadata which explicitly indicates suitable splice points (e.g. as described in Annex A of ISO/IEC 13818-1) in the transport stream, and the metadata indicates only splice points which occur just before suitable A/V I-Frame pairs. Such indicated splice points are potential seamless splice points in the transport stream. Optionally, the format of the video may imply further requirements for seamless splice points (e.g., depending on the format of the video encoding used to generate the transport stream, not every video I-Frame may be suitable as a seamless splice point), and the metadata indicates (as suitable splice points) only splice points which occur just before suitable A/V I-Frame pairs and which also satisfy such further requirements.

A transport stream (e.g., an MPEG-2 transport stream) generated (e.g., by unit 3 of FIG. 3) in accordance with some embodiments in the first class of embodiments includes metadata ("splicing metadata") indicative of whether the transport stream (or a program indicated thereby) has a perfect splicing property (e.g., metadata indicative of whether the transport stream or program has the essential perfect splicing property and at least one other perfect splicing property). For example, such splicing metadata may include or consist of any of the specific examples of splicing metadata described with reference to the second class of embodiments of the invention.

FIG. 1 is a diagram of three splice points, each in a different transport stream. Each transport stream includes a different sequence of TS packets (with those TS packets which include encoded audio data labeled with an "A" and those TS packets which include video data labeled with a "V"). In the example of FIG. 1, it is assumed that processing is done by a splicer having a simple implementation, with little memory, and no awareness of what encoding (e.g., AC-4) has been performed on the audio in the transport stream to be spliced. In operation, this splicer would determine a potential splice point simply by locating a position in the video stream at which one video frame has completed but the next one has not yet started (and consider such point as a potential splice point).

With reference to the example of FIG. 1, the bottom one of the three transport streams in FIG. 1 has the above-described "guard bands in transport stream" perfect splicing property, but each of the top two transport streams in FIG. 1 lacks such "guard bands in transport stream" perfect splicing property. In each of the transport streams of FIG. 1, each video TS packet before (i.e., to the left of, in FIG. 1) the splice point is a TS packet of A/V/I-frame pair number "n", and each video TS packet after (i.e., to the right of, in FIG. 1) the splice point is a TS packet of the next A/V/I-frame pair (A/V/I-frame pair number "n+1"). The splicer is not aware of what encoding has been performed on the audio in any of the transport streams.

When splicing either one of the top two transport streams of FIG. 1 (which do not satisfy the "guard bands in transport stream" perfect splicing property), the splicer may splice in the middle of an audio frame that is next to the video frame (whose start or end it has identified as a potential splice point), damaging the audio frame. Even if the splice does not damage the audio frame, it can cause other problems. For example, in the top transport stream of FIG. 1, we assume that the audio TS packet above the exclamation mark (the first audio TS packet after the splice point) corresponds to the video frame of the video TS packet preceding it, i.e. the two TS packets are to be presented at the same time and should be treated as an inseparable unit. In this case, a splice at the splice point indicated (in the top transport stream of FIG. 1) would be wrong in the sense that it would undesirably cause an audio packet to be missing from the spliced stream which precedes the splice point.

Similarly, in the middle transport stream of FIG. 1, we assume that the audio TS packet above the exclamation mark (the last audio TS packet before the splice point) corresponds to the video frame of the video TS packet following it, i.e. the two TS packets are to be presented at the same time and should be treated as an inseparable unit. In this case, a splice in the middle transport stream at the splice point indicated (in the middle transport stream of FIG. 1) would be wrong in the sense that it would cause an audio packet to be missing from the spliced stream which follows the splice point.

In the bottom transport stream of FIG. 1, the splicer chooses the splice point to occur between two video frames, and since audio is multiplexed into the transport stream so as to be far away from that potential splice point, a splice at this point cannot damage the audio in any way (even though the splicer is unaware of what audio data corresponds to each video frame).

Figure 2:
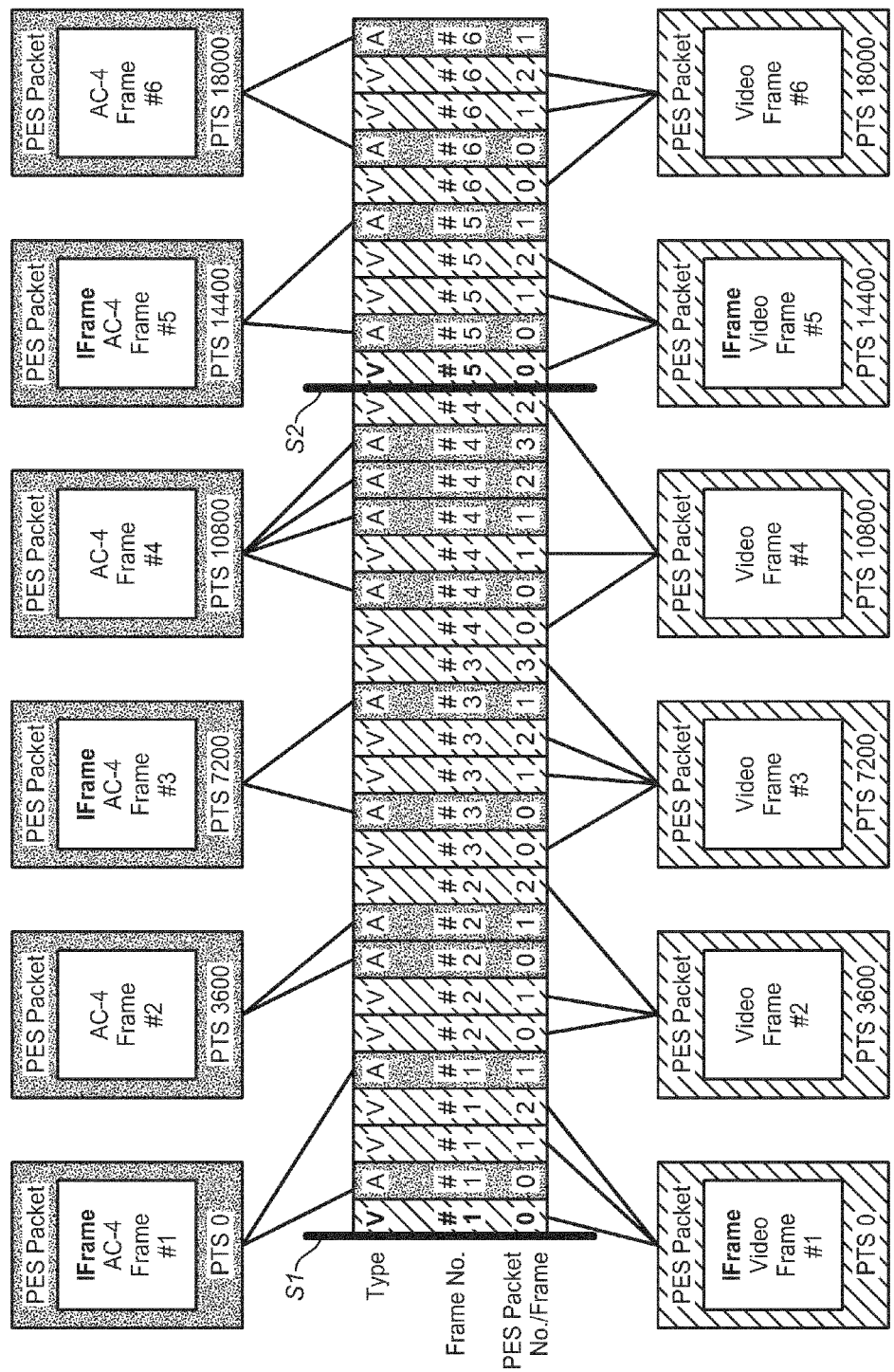
FIG. 2 is a diagram of an example of an MPEG-2 transport stream having the essential perfect splicing property and five additional perfect splicing properties ("PES alignment of A/V I-frames," "A/V I-frame pair PTS values match," "constant hyperframe bitrate," "data alignment in transport stream," and "guard bands in transport stream").

FIG. 2 is a diagram of an example of an MPEG-2 transport stream having the above-defined essential perfect splicing property, and the first five ("PES alignment of A/V I-frames," "A/V I-frame pair PTS values match," "constant hyperframe bitrate," "data alignment in transport stream," and "guard bands in transport stream") of the six additional perfect splicing properties listed and defined above. To generate the MPEG-2 transport stream of FIG. 2, audio frames are packaged into PES packets (shown in enlarged versions in the top row of FIG. 2), and video frames are packaged into PES packets (shown in enlarged versions in the bottom row of FIG. 2). Each of the PES packets indicative of an audio frame has different one of PTS values 0, 3600, 7200, 10800, 14400, and 18000, and each of the PES packets indicative of a video frame has different one of the PTS values 0, 3600, 7200, 10800, 14400, and 18000.

Each PES packet is packaged as a set of transport stream (TS) packets, and the MPEG-2 transport stream comprises the indicated sequence of TS packets (shown in the middle row of FIG. 2). Transport stream splicers that process the transport stream can potentially splice at the positions marked with bars S1 and S2, each of which positions occurs just before a video I-Frame, and thus leave audio undisturbed. To simplify the example, all frames indicated in FIG. 2 are PES-Packet-aligned (even between I-Frames, where it is not required).

In a second class of embodiments, the invention is a method for generating (e.g., in unit 3 of FIG. 3) a transport stream (e.g., an MPEG-2 transport stream), which is indicative of at least one audio/video program ("program"), and includes metadata ("splicing metadata") indicative of whether the program has a perfect splicing property (e.g., metadata indicative of whether the program has an essential perfect splicing property and/or at least one other perfect splicing property). If the transport stream is indicative of at least two programs, the splicing metadata may be indicative of whether each of the programs has a perfect splicing property (e.g., whether or not each individual one of the programs has the perfect splicing property). The splicing metadata may be collectively indicative of (i.e., pertain to) all programs indicated by the transport stream, or may be specifically indicative of each individual program (or a subset of all the programs) indicated by the transport stream.

The splicing metadata of a transport stream generated in accordance with an embodiment in the second class may be indicative of whether at least one program (e.g., each program) indicated by the transport stream has the "essential" perfect splicing property (defined above with reference to the first class of embodiments) and/or whether at least one program indicated by the transport stream has at least one additional perfect splicing property (of any the types defined above with reference to the first class of embodiments).

With reference to the second class of embodiments, the expression that a program indicated by a transport stream "has" (i.e., satisfies) a perfect splicing property denotes that data of the transport stream which is indicative of the program (e.g., frames of video data, including I-frames of video data, which determine at least one video elementary stream of the program and frames of encoded audio data, including I-frames of encoded audio data, which determine at least one audio elementary stream of the program) has the perfect splicing property (e.g., other data of the transport stream, indicative of at least one other program, may not have the perfect splicing property).

A transport stream generated in accordance with a typical embodiment in the second class includes (for each program indicated by the transport stream) frames of video data (which determine at least one video elementary stream for the program) and frames of encoded audio data (which determine at least one audio elementary stream for the program). The frames of video data (e.g., video frames #1, #2, #3, #4, #5, and #6 of FIG. 2) include I-frames of video data (e.g., video I-frames #1 and #5 of FIG. 2), and the frames of encoded audio data (e.g., the audio frames identified as AC-4 frame #1, AC-4 frame #2, AC-4 frame #3, AC-4 frame #4, AC-4 frame #5, and AC-4 frame #6 of FIG. 2) include I-frames of encoded audio data (e.g., audio I-frames AC-4 frame #1, AC-4 frame #3, and AC-4 #5 of FIG. 2), Data (in a transport stream generated in accordance with an embodiment in the second class) indicative of a program of the transport stream may have the above-defined essential perfect splicing property and may also have one or more of the additional perfect splicing properties described above. The option to generate the data (indicative of the program) to satisfy at least one such additional perfect splicing property allows the transport stream creator to choose which perfect splicing property or properties should be satisfied. Satisfaction of more perfect splicing properties typically requires more overhead for transport stream generation but allows use of simpler splicer implementations.

Inclusion of splicing metadata in a transport stream (indicative of whether a program indicated by the transport stream satisfies each of at least one perfect splicing property) enables a splicer to parse such metadata from the transport stream to determine whether data (of the transport stream) which is indicative of the program's elementary streams can be spliced (and otherwise processed) in an expected manner, and to issue warnings to the operator if a transport stream (or data thereof which is indicative of a program's elementary streams) does not conform to what is supported by that splicer.

A transport stream generated in accordance with an embodiment in the second class to be indicative of least two programs may include splicing metadata for each of the programs. The splicing metadata for each program may be indicative of whether the program satisfies at least one perfect splicing property. For example, the splicing metadata may indicate whether the program satisfies each of at least two perfect splicing properties.

As noted, a transport stream may be indicative of multiple programs. Each program may include multiple elementary streams (e.g., a video elementary stream, and one or more encoded audio elementary streams). Typically, each elementary stream has an associated descriptor (sometimes referred to herein as an "elementary stream descriptor") that includes information characterizing or otherwise related to the elementary stream. By analyzing the descriptor of each elementary stream, splicers can determine whether the transport stream (or a program thereof) has the properties they require (and optionally issue a warning or error in case some of the expected properties are not there). The splicing metadata included in a transport stream in accordance with typical embodiments of the invention may be included in elementary stream descriptors of the transport stream (and may be indicative of each perfect splicing property of the program which includes the elementary stream). Alternatively, the splicing metadata may be included in other parts (segments) of the transport stream (and may be indicative collectively of all programs of the transport stream, or individually indicative of each program of the transport stream.

In typical embodiments, each perfect splicing property of a transport stream is in regard to the elementary stream(s) of a program indicated by the transport stream, and the transport stream includes splicing metadata for each program of the transport stream, and the splicing metadata for each program indicates each perfect splicing property satisfied by the elementary stream(s) of the program. For example, a transport stream generated in accordance with an embodiment in the second class may include (i.e., may include data indicative of) a program with one video elementary stream and two audio elementary streams. In this example, the data of the transport stream which determines the program may have a perfect splicing property, and the transport stream may include splicing metadata (for the program) which indicates the perfect splicing property satisfied by the elementary streams of the program.

We next describe examples of splicing metadata included in transport streams which are generated in accordance with embodiments in the second class. The splicing metadata included in such a transport stream may include (or consist of) all or some of:

metadata indicative of whether at least one program of the transport stream (i.e., data, of the transport stream, which is indicative of each said program) satisfies the property of identical frame rates for video and encoded audio (for example, a framerate_match bit in a descriptor of the transport stream is set (to a "one" value) if the identical frame rate property is satisfied. Otherwise, such bit remains unset (as a "zero" value));

metadata indicative of whether at least one program of the transport stream satisfies the I-frame synchronization property (for example, an frames synced bit in the descriptor of the transport stream is set (to a "one" value) if the I-frame synchronization property is satisfied. Otherwise, such bit remains unset (as a "zero" value));

metadata indicative of whether at least one program of the transport stream satisfies the "PES Alignment of A/V I-frames" perfect splicing property. For example, the splicing metadata may be a bit in a descriptor of the transport stream (i.e., an iframes_pes_aligned bit) for each program of the transport stream which satisfies the property. Such an iframes_pes_aligned bit would be set (to a "one" value) if the property is satisfied for the program. Otherwise, the bit would remain unset (as a "zero" value);

metadata indicative of whether at least one program of the transport stream satisfies the "A/V I-frame pair PTS values match" perfect splicing property. For example, the splicing metadata may be a bit in a descriptor of the transport stream (i.e., an iframes_pts_match bit) for each program of the transport stream which satisfies the property. Such an iframes_pts_match bit would be set (to a "one" value) if the property is satisfied for the program. Otherwise, the bit would remain unset;

metadata indicative of whether at least one program of the transport stream satisfies the "constant hyperframe bitrate" perfect splicing property. For example, the splicing metadata may be a bit in a descriptor of the transport stream (i.e., a constant_hyperframe_bitrate bit) for each program of the transport stream which satisfies the property. Such a constant_hyperframe_bitrate bit would be set (to a "one" value) if the property is satisfied for the program. Otherwise, the bit would remain unset (as a "zero" value);

metadata indicative of whether at least one program of the transport stream satisfies the "data alignment in transport stream" perfect splicing property. For example, the splicing metadata may be a bit in a descriptor of the transport stream (i.e., an avdata_aligned bit) for each program of the transport stream which satisfies the property. Such an avdata_aligned bit would be set (to a "one" value) if the property is satisfied for the program. Otherwise, the bit would remain unset (as a "zero" value);

metadata indicative of whether at least one program of the transport stream satisfies the "guard bands in transport stream" perfect splicing property. For example, the splicing metadata may be a bit in a descriptor of the transport stream (i.e., a guardband bit) for each program of the transport stream which satisfies the property. Such a guardband bit would be set (to a "one" value) if the property is satisfied for the program. Otherwise, the bit would remain unset (as a "zero" value); and/or metadata indicative of whether at least one program of the transport stream satisfies the "splice points marked in transport stream" perfect splicing property. For example, the splicing metadata may be a bit in a descriptor of the transport stream (i.e., a splicemarkers bit) for each program of the transport stream which satisfies the property. Such a splicemarkers bit would be set (to a "one" value) if the property is satisfied for the program. Otherwise, the bit would remain unset (as a "zero" value).

In the above example in which the splicing metadata for a program includes a framerate_match bit and an iframes_synced bit, if both such bits are set (both have the logical value "one"), the splicing metadata indicates that the program satisfies the essential perfect splicing property (in that it has identical frame rates for video and encoded audio, and satisfies the I-frame synchronization property).

In some embodiments, the invention is a method for splicing a transport stream (e.g., an MPEG-2 transport stream) having the essential perfect splicing property, thereby generating a spliced transport stream (e.g., the output of an implementation of splicer 7 of FIG. 3 which is configured to perform such splicing method) without modifying any encoded audio elementary stream of the transport stream (although in some cases, the splicer may need to perform re-multiplexing or other modification of the transport stream, in a manner which does not include modification of the data of any encoded audio elementary stream of the transport stream). Optionally, the transport stream also includes at least one of the above-described additional perfect splicing properties (e.g., the stream may have the essential perfect splicing property, and all of the additional perfect splicing properties). If the transport stream satisfies the essential perfect splicing property, the splicing is performed such that audio/video synchronization in the transport stream is maintained in the spliced transport stream.

In some embodiments, the invention is a method for splicing a transport stream (e.g., a MPEG-2 transport stream) which has been generated, in accordance with any embodiment in the second class, to include splicing metadata. The method includes steps of: (a) parsing (e.g., in splicer 7 of FIG. 3) at least a portion of the transport stream to identify the splicing metadata (e.g., splicing metadata in elementary stream descriptors of the transport stream); and (b) upon determining (e.g., in splicer 7 of FIG. 3) that the splicing metadata indicates that at least a segment of the transport stream (e.g., the entire transport stream, or a program indicated by the transports stream) has at least one perfect splicing property, including an essential perfect splicing property, splicing the transport stream without modifying any encoded audio elementary stream of the transport stream, thereby generating a spliced transport stream (e.g., the output of an implementation of splicer 7 of FIG. 3 which is configured to perform such splicing method). If the transport stream (or a segment thereof which is spliced) has the essential perfect splicing property, step (b) is performed such that audio/video synchronization in the transport stream is maintained in the spliced transport stream.

Each of units 3 and 7 of FIG. 3 may be implemented as a hardware system.

Typically, unit 3 of FIG. 3 includes at least one buffer 3A, unit 3' of FIG. 3 includes at least one buffer 3A', and splicer 7 of FIG. 3 includes at least one buffer (7A and/or 7E). Typically, each of buffers 3A, 3A', 7A, and 7E is a buffer memory coupled to receive a sequence of packets of the transport stream, and in operation the buffer memory stores (e.g., in a non-transitory manner) at least one segment of the transport stream. In typical operation of unit 3 (or 3'), a sequence of segments of the transport stream is asserted from buffer 3A to delivery subsystem 5 (or from buffer 3A' to delivery subsystem 5'. In typical operation of splicer 7, a sequence of segments of a transport stream to be spliced is asserted from buffer 7A to parsing subsystem 7B of splicer 7, and from buffer 7D to parsing subsystem 7E of splicer 7.

Unit 3 and/or splicer 7 of FIG. 3 (or any component or element thereof) may be implemented as one or more processes and/or one or more circuits (e.g., ASICs, FPGAs, or other integrated circuits), in hardware, software, or a combination of hardware and software.

Another aspect of the invention is a processing unit (AVPU) configured to perform any embodiment of the inventive method (e.g., generation or splicing of a transport stream having the essential perfect splicing property and/or including splicing metadata). For example, the AVPU may be a splicer configured to perform any embodiment of the inventive transport stream splicing method (e.g., an appropriately configured embodiment of splicer 7 of FIG. 3). In another class of embodiments, the invention is an AVPU (e.g., unit 3 or splicer 7 of FIG. 3) including at least one buffer memory (e.g., buffer 3A in unit 3 of FIG. 3, or buffer 7A or 7E of splicer 7 of FIG. 3) which stores (e.g., in a non-transitory manner) at least one segment of a transport stream which has been generated by any embodiment of the inventive method (e.g., a transport stream which satisfies at least the essential perfect splicing property defined herein, and optionally also at least one additional perfect splicing property of any type defined herein). The segment stored in the buffer may include splicing metadata (which has been included in the transport stream in accordance with any embodiment of the inventive method). Examples of AVPUs include, but are not limited to encoders (e.g., transcoders), decoders (e.g., decoders configured to decode content of a transport stream, and/or to perform splicing to generate a spliced transport stream and to decode content of the spliced transport stream), codecs, splicers, pre-processing systems (pre-processors), post-processing systems (post-processors), transport stream processing systems, and combinations of such elements.

Aspects of the invention include a system or device configured (e.g., programmed) to perform any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

Embodiments of the present invention may be implemented in hardware, firmware, or software, or a combination thereof (e.g., as a programmable logic array). For example, unit 3 and/or splicer 7 of FIG. 3 may be implemented in appropriately programmed (or otherwise configured) hardware or firmware, e.g., as a programmed general purpose processor, digital signal processor, or microprocessor. Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., an implementation of all or some of elements of unit 3 and/or splicer 7 of FIG. 3), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of embodiments of the invention have been described. It should be understood that various modifications may be made without departing from the spirit and scope of the invention. Numerous modifications and variations of the present invention are possible in light of the above teachings. It is to be understood that within the scope of the appended claims, the invention may be practiced otherwise than as specifically described herein.

The invention claimed is:
1. A method for generating a transport stream, including steps of:
  (a) providing, using a transport stream generator implemented by a processor, encoded audio data and video data indicative of at least one program, wherein for each program of the at least one program including a given program, the encoded audio data and video data indicative of the given program includes frames of video data which determine at least one video elementary stream and frames of encoded audio data which determine at least one audio elementary stream, the frames of video data include I-frames of video data, and the frames of encoded audio data include I-frames of encoded audio data; and
  (b) including the encoded audio data and the video data in the transport stream such that said transport stream has an essential perfect splicing property, where the essential perfect splicing property is that:
  for each program of the at least one program including the given program indicated by the transport stream, each video elementary stream of the given program has a frame rate which is the same as the frame rate of each encoded audio elementary stream of the given program, and for each video frame of the given program there is at least one corresponding encoded audio frame of the given program; and
  for each program of the at least one program including the given program indicated by the transport stream, for each video I-frame in each video elementary stream of the given program, there is at least one matching audio I-frame in an audio elementary stream of the given program,
  wherein the transport stream includes metadata that indicates that the transport stream has the essential perfect splicing property, and wherein the metadata does not identify splice points in the transport stream,
  wherein a splicer device uses the metadata to generate a warning when the transport stream has less than a full set of perfect splicing properties, and
  wherein including the encoded audio data and the video data in the transport stream includes:
    determining, by the transport stream generator, that the frame rate of each video elementary stream of the program is not the same as the frame rate of each encoded audio elementary stream of the program; and
    in response to the determining, re-encoding at least one elementary stream of the program when the frame rate for another elementary stream of the program has changed, so that the frame rate of each video elementary stream of the program is the same as the frame rate of each encoded audio elementary stream of the program after re-encoding.

2. The method of claim 1, wherein the transport stream is an MPEG-2 transport stream.

3. The method of claim 2, wherein the encoded audio data are compressed audio data having AC-4 format.

4. The method of claim 1, wherein step (b) is performed such that said transport stream also has at least one additional perfect splicing property.

5. The method of claim 4, wherein each said video elementary stream and each said audio elementary stream is packetized in packetized elementary stream ("PES") packets, and the at least one additional perfect splicing property is that:
  for each program of the transport stream, each video I-frame in a video elementary stream of the program is PES packet aligned with an encoded audio I-frame of the program.

6. The method of claim 5, wherein the transport stream is an MPEG-2 transport stream.

7. The method of claim 4, wherein the at least one additional perfect splicing property is that:
  for each program of the transport stream, for each video I-frame of the program there is at least one matching audio I-frame, where each pair of I-frames comprising one said video I-frame and an audio I-frame which matches said video I-frame is an A/V I-frame pair, and where the I-frames of each said A/V I-frame pair have matching presentation time stamp (PTS) values.

8. The method of claim 7, wherein the transport stream is an MPEG-2 transport stream.

9. The method of claim 7, wherein the at least one additional perfect splicing property is that:
  for each program of the transport stream, the average bit rate for every hyperframe of the program is constant, where each said hyperframe is a sequence of audio frames starting with an audio I-frame of an A/V-I-frame pair of the program, and ending with the audio frame just previous to the next A/V I-Frame pair of the program.

10. The method of claim 9, wherein the transport stream is an MPEG-2 transport stream.

11. The method of claim 7, wherein the at least one additional perfect splicing property is that:
  for each program of the transport stream, each sequence of A/V frames that comprises an A/V I-frame pair of the program and the A/V frames that follow up to the next A/V I-frame pair of the program, is time-multiplexed to occur in a single, continuous segment of the transport stream.

12. The method of claim 7, wherein the at least one additional perfect splicing property is that:
  for each program of the transport stream, for each A/V I-frame pair of the program, sending of transport stream packets carrying the encoded audio data of said A/V I-frame pair does not start before the sending of transport stream packets carrying the video data of said A/V I-frame pair has started, and for an audio frame that occurs just before each A/V I-frame pair of the program, all audio data transport stream packets for said audio frame are sent before the sending of the last video data transport stream packet that precedes the A/V I-frame pair.

13. The method of claim 7, also including a step of:
  including in the transport stream additional metadata which explicitly indicates suitable splice points in the transport stream, and the additional metadata indicates only splice points which occur just before suitable A/V I-Frame pairs.

14. The method of claim 1, wherein the at least one program includes at least a first program and a second program, wherein the metadata indicates that the first program has the essential perfect splicing property, and wherein the metadata indicates that the second program does not have the essential perfect splicing property.

15. The method of claim 1, wherein the metadata indicates that the transport stream has at least one additional perfect splicing property.

16. A method for transport stream splicing, including steps of:

(a) providing, using a transport stream generator implemented by a processor, a transport stream having an essential perfect splicing property, where the transport stream is indicative of encoded audio data and video data, the encoded audio data and the video data are indicative of at least one program, for each program of the at least one program including a given program the encoded audio data and video data indicative of the given program includes frames of video data which determine at least one video elementary stream and frames of encoded audio data which determine at least one audio elementary stream, the frames of video data include I-frames of video data, and the frames of encoded audio data include I-frames of encoded audio data, and wherein the essential perfect splicing property is that:

for each program of the at least one program including the given program indicated by the transport stream, each video elementary stream of the given program has a frame rate which is the same as the frame rate of each encoded audio elementary stream of the given program, and for each video frame of the given program there is at least one corresponding encoded audio frame of the given program; and for each program of the at least one program including the given program indicated by the transport stream, for each video I-frame in each video elementary stream of the given program, there is at least one matching audio I-frame in an audio elementary stream of the program; and (b) splicing the transport stream, using a splicer device, thereby generating a spliced transport stream, without modifying any encoded audio elementary stream of the transport stream, wherein the transport stream includes metadata that indicates that the transport stream has the essential perfect splicing property, and wherein the metadata does not identify splice points in the transport stream, wherein the splicer device uses the metadata to generate a warning when the transport stream has less than a full set of perfect splicing properties, and wherein providing the transport stream includes:
  determining, by the transport stream generator, that the frame rate of each video elementary stream of the program is not the same as the frame rate of each encoded audio elementary stream of the program; and
  in response to the determining, re-encoding at least one elementary stream of the program when the frame rate for another elementary stream of the program has changed, so that the frame rate of each video elementary stream of the program is the same as the frame rate of each encoded audio elementary stream of the program after re-encoding.

17. The method of claim 16, wherein the transport stream is an MPEG-2 transport stream.

18. The method of claim 17, wherein the encoded audio data are compressed audio data having AC-4 format.

19. The method of claim 16, wherein the transport stream also has at least one additional perfect splicing property.

20. A system for generating a transport stream, said system including:
  an encoder, implemented by a processor, that encodes audio data and generates encoded audio data; and
  a transport stream generator, implemented by the processor that generates the transport stream in response to video data and the encoded audio data, such that the video data and the encoded audio data are included in said transport stream in such a manner that said transport stream has an essential perfect splicing property, the video data and the encoded audio data are indicative of at least one program, wherein for each program of the at least one program including a given program, the encoded audio data and video data indicative of the given program includes frames of video data which determine at least one video elementary stream and frames of encoded audio data which determine at least one audio elementary stream, the frames of video data include I-frames of video data, and the frames of encoded audio data include I-frames of encoded audio data, and where the essential perfect splicing property is that:

for each program of the at least one program including the given program indicated by the transport stream, each video elementary stream of the given program has a frame rate which is the same as the frame rate of each encoded audio elementary stream of the given program, and for each video frame of the given program there is at least one corresponding encoded audio frame of the given program; and for each program of the at least one program including the given program indicated by the transport stream, for each video I-frame in each video elementary stream of the given program, there is at least one matching audio I-frame in an audio elementary stream of the given program, wherein the transport stream includes metadata that indicates that the transport stream has the essential perfect splicing property, and wherein the metadata does not identify splice points in the transport stream, wherein a splicer device uses the metadata to generate a warning when the transport stream has less than a full set of perfect splicing properties, and wherein including the encoded audio data and the video data in the transport stream includes:
  determining that the frame rate of each video elementary stream of the program is not the same as the frame rate of each encoded audio elementary stream of the program; and
  in response to the determining, re-encoding at least one elementary stream of the program when the frame rate for another elementary stream of the program has changed, so that the frame rate of each video elementary stream of the program is the same as the frame rate of each encoded audio elementary stream of the program after re-encoding.

21. The system of claim 20, wherein the transport stream is an MPEG-2 transport stream.

22. The system of claim 20, wherein the encoder encodes the audio data so that the encoded audio data are compressed audio data having AC-4 format.

23. The system of claim 20, wherein the transport stream generator generates the transport stream such that said transport stream also has at least one additional perfect splicing property.

* * * * *